May 5, 1959   J. H. ROWEN   2,885,640
NONRECIPROCAL CIRCUIT ELEMENT
Filed May 23, 1958

INVENTOR
J. H. ROWEN
BY Roy M. Porter Jr.
ATTORNEY

United States Patent Office 2,885,640
Patented May 5, 1959

2,885,640
NONRECIPROCAL CIRCUIT ELEMENT

John H. Rowen, Plainfield, N.J., assignor to Bell Telephone Laboratories, Incorporated, New York, N.Y., a corporation of New York Application May 23, 1958, Serial No. 737,410

9 Claims. (Cl. 333—11)

This invention relates to nonreciprocal transmission circuits for electromagnetic wave energy and, more particularly, to multibranch networks including gyromagnetic material for establishing nonreciprocal transmission paths for such energy among a plurality of electromagnetic wave energy devices.

During the past several years the electromagnetic wave transmission art has been substantially advanced by the development of a group of nonreciprocal transmission components utilizing one or more of the several nonreciprocal effects produced by polarized elements of gyromagnetic material, oftentimes of the class of materials designated ferrite. A survey of wave energy components employing ferrites may be found in the Proceedings of the I.R.E., vol. 44, No. 10, October 1056. Included within this group of components are devices known as "circulators" which couple electromagnetic wave energy from a first given transmission path to a second given transmission path but under identical operating conditions couple electromagnetic wave energy from the second given transmission path to a third given transmission path different from said first transmission path.

Structures and techniques for utilizing one or more of the several nonreciprocal effects produced by polarized elements of gyromagnetic material at frequencies of wave energy below a few thousand megacycles are disclosed in my copending applications, Serial No. 544,783, filed November 3, 1955, Serial No. 485,280, filed January 31, 1955 and Serial No. 602,102, filed August 6, 1956; and in the copending application of A. M. Clogston Serial No. 485,281, filed January 31, 1955. These structures comprise networks capable of introducing either a nonreciprocal attenuation or a nonreciprocal phase shift to wave energy in the frequency range in which coaxial and balanced transmission lines are used. This frequency range includes those particular ranges which have been designated very high frequency and ultrahigh frequency.

In accordance with the present invention, the low frequency techniques introduced in the above-noted copending applications are extended to a three-terminal pair circulator. The present invention fills the need for a low frequency circuit similar to the waveguide circulators described in an article entitled "Behavior and Applications of Ferrites in the Microwave Region" by A. G. Fox, S. E. Miller, and M. T. Weiss, Bell System Technical Journal, January 1955, pages 5–103. The present circulator is operable with coaxial line inputs and outputs or with balanced transmission line inputs and outputs.

It is therefore, an object of this invention to interconnect three transmission paths $a$, $b$, $c$, so that a source of electromagnetic waves associated with $a$ actuates $b$ but not $c$; a source associated with $b$ actuates $c$ but not $a$; and a source associated with $c$ actuates $a$, but not $b$.

It is a more specific object of this invention to establish circulator action among the terminal pairs of a three-terminal pair network operable directly with either coaxial or balanced transmission line inputs and outputs for wave energy in the frequency range below the microwave wavelength range.

Another object is to excite a three-terminal, four-conductor structure including gyromagnetic material in a manner producing circulator action among the externally connected transmission paths.

As disclosed in the above-noted copending applications Serial Nos. 544,783 and 602,102, a gyromagnetic device comprising four conductors arranged in diametrally opposite pairs on the circumference of a circle whose central portion is occupied by a longitudinally biased gyromagnetic element will transfer wave energy applied between a given conductor pair from this pair to the other conductor pair as the energy traverses the structure. If the conductors of each conductor pair are connected through shorting bars at a point remote from the excited end of the structure, the energy traveling from the excited end will be totally reflected at the shorted end. As the energy returns toward the excited end, the energy transfer between the conductor pairs continues. This energy transfer, which results from coupling between the energy supported by the conductor pairs and precessing electrons within the polarized gyromagnetic material, has a phase that is dependent upon the direction of precession of the electrons and independent of the direction of wave propagation along the conductor pairs.

In accordance with the present invention, it has been recognized that if any two adjacent conductors at the excited end of the four-conductor structure are strapped together by a substantially zero resistance connection, the resulting three-terminal network has the unusual property that the reflected energy returns to the excited end with a phase that may reenforce the excited energy between two of the three terminals and may at the same time cancel the excited energy between another two of the three terminals. Stated differently, the reflected energy and the applied energy have a phasal relationship at the excited end which presents an electrical short circuit, or zero impedance level, between a given terminal and one of the remaining two terminals while at the same time presents an electrical open circuit, or infinite impedance level, between the given terminal and the other of the remaining two terminals. As a result of such an impedance configuration, current will flow, for a proper excitation of the three-terminal network, exclusively in the circuit of which the zero impedance is a branch while no current will flow in the circuit of which the infinite impedance is a branch.

Nonreciprocal operation of the device is uniquely determined by the manner in which the three-terminal, four-conductor structure is excited. Thus if three external transmission line branches each comprising a two-conductor circuit are connected to the network so that whenever one of the three circuits is excited, the remaining two are respectively in series with the infinite impedance presented between the terminals at which the phasal reinforcement occurs and the zero impedance presented between the terminals at which the phasal cancellation occurs, energy from the exciting circuit will appear exclusively in the external circuit that is in series with the network terminals between which the zero impedance appears. Specifically, this connection is achieved if one conductor of each of the three circuits is connected to a common point and the remaining three conductors are connected one each to each of the terminals of the three-terminal network. The resulting combination will produce a coupling characteristic among the three external transmission line branches that is typical of the class of networks known as circulators.

A particular advantage of the present invention resides in its inherent adaptability for use with unbalanced transmission lines such as coaxial lines. When coaxial lines are used, the above-described commonly connected conductors become the outer concentric conductors of the coaxial line and may be maintained at ground potential.

These and other objects and features, the nature of the present invention, and its various advantages will appear more fully upon consideration of the specific illustrative embodiments shown in the accompanying drawing and described in the detailed description thereof.

Figure 1:
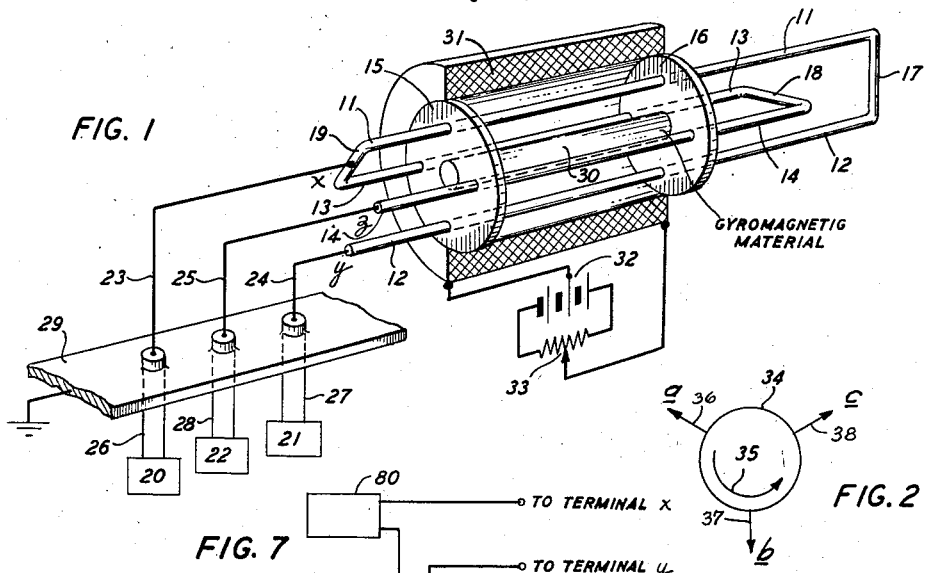
Fig. 1 is a view of a circulator in accordance with the invention, partially in perspective and partially in schematic, interconnecting three coaxial type wave energy devices.

Referring more particularly to Fig. 1, an illustrative embodiment of a three-terminal-pair circulator circuit in accordance with the invention is shown. Four similar elongated conductors or wires 11, 12, 13, 14 extend longitudinally in parallel relationship and are transversely located at equally spaced points around the circumference of a circle. The radius of each conductor should be small compared to the shortest distance between conductor centers. Thin transversely extending dielectric spacers 15, 16 are longitudinally spaced apart in order to support the conductors in proper relation to each other. The right-hand extensions of diametrally opposed conductors 11, 12 comprising one conductor pair are connected by highly conductive shorting bar 17. The right-hand extensions of conductor pair 13, 14 are similarly connected by shorting bar 18.

At the left-hand end of the conductor pairs, a substantially zero resistance path is provided between the two adjacent conductors 11, 13 by strapping them together with shorting member 19. From both a physical and an electrical standpoint, shorting member 19 converts the four-conductor arrangement set out above into a three-terminal network. Thus shorting member 19 becomes terminal $x$; the extension of conductor 12, terminal $y$; and the extension of conductor 14, terminal $z$ of the network.

Electromagnetic transmission line branches or wave energy devices 20, 21, 22 each comprising a two-conductor circuit are connected such that one conductor of each of the branches is held at a common potential and the remaining conductors are connected one each to each of terminals $x$, $y$, $z$, of the three-terminal network. The individual external dual conductor wave energy devices or branches may be either energy sources or energy utilizing means. It is preferable that the impedance level associated with each of branches 20–22 be approximately equal to the impedance $Z_0$ presented by conductor pairs 11, 12 and 13, 14 to wave energy propagating therealong. For any particular application of the invention, of course, one of the three branches should be an energy source while the remaining two should be energy utilizing means or sinks. In the specific embodiment of Fig. 1, the three-terminal network is illustrated in combination with coaxial type external transmission line branches. Thus, coaxial lines 26, 27, 28 are connected through their respective center conductors 23, 24, 25 to network terminals $x$, $y$, and $z$, respectively. The outer shield of each coaxial line is maintained at the conventional ground potential by means of their connection to grounded common connection 29.

It should be noted that in coaxial type input and output applications of the present invention in which the outer coaxial conductors are held at ground potential, it is preferable that no metallic shield which is held at ground potential enclose the three-terminal four-conductor network. Such a limitation is dictated by the capacitance which would thereby appear between the conductors and ground and which would interfere with the operation of the network in its providing the phasal relationships between the excited and reflected energy necessary for circulator action among the external transmission line branches.

The present invention, as will be pointed out in a later portion of this specification is not limited, however, to operation with coaxial type input and output circuits. Balanced transmission lines, if connected to the four-conductor network in accordance with the present invention, are likewise capable of participation in the circulator action.

Nonreciprocal coupling means extend longitudinally between the left and right ends of conductors 11 through 14 in Fig. 1. These means are represented by elongated cylinder or rod shaped element 30 which is disposed along the central portion of the circle defined by the transverse locations of the conductors. Element 30 may be appropriately supported by extending it through centrally located apertures in dielectric spacers 15, 16.

The material of element 30 is of the type commonly designated as gyromagnetic material. The term "gyromagnetic material" is employed here in its accepted sense as designating the class of materials having portions of the atom thereof that are capable of being aligned by an external magnetic field and capable of exhibiting a significant precessional motion at frequencies within the microwave frequency range, this precessional motion having an angular momentum, a gyroscopic moment, and a magnetic moment. One gyromagnetic material which is particularly suitable at the lower microwave frequencies contemplated by the present invention is magnesium-manganese-aluminum ferrite. This particular material has been found to exhibit, at magnetic biasing field strengths obtainable in practice, substantial gyromagnetic precessional effects in a considerably lower frequency range than some priorly considered ferrites. These frequecies have been observed to include the frequency range from below 170 megacycles per second to 2,000 megacycles per second at field strengths ranging from below 200 to 850 oersteds, respectively. Gyromagnetic materials other than those of the class known as ferrites may also be used in the present invention.

In Fig. 1, element 30 is biased by a polarizing magnetic field applied longitudinally parallel to conductors 11 through 14. This field may be supplied by a structure such as solenoid 31 which is circumferentially mounted about the four-conductor structure. The solenoid is supplied with an energizing current from source 32 and rheostat 33. As illustrated, rheostat 33 is connected in parallel with source 32 in order that the current through solenoid 31 may be reversed, thereby reversing the longitudinal direction of the biasing field supplied to element 30. It should be noted, however, that element 30 may be magnetized by a solenoid of other suitable physical design, by a permanent magnet structure, or by permanent magnetization of the material of element 30 itself. This latter method is especially attractive when the presence of a metallic shielding structure is undesirable.

The coupling produced by element 30 can be explained by recognizing that the gyromagnetic material of which it is composed contains unpaired electron spins which tend to line up with the applied field. These spins have an associated magnetic moment which can be made to precess about the line of the biasing magnetic field, keeping an essentially constant moment component in the direction of the applied biasing field and at the same time providing a moment component which may rotate in a plane normal to the field direction. Thus when the reciprocating high frequency magnetic field of electromagnetic wave energy is impressed upon the moment, the moment will commence to precess in one angular sense.

The combined effect of many such electrons and their associated moments produces in the gyromagnetic material not only a flux representing the impressed reciprocating magnetic field but also a flux representing the reciprocating field of a coupled wave normal in space to the applied field and displaced in time from the applied field by a phase determined by the direction of precession of the electrons and independent of the direction of propagation of the wave energy along the conductors.

In the device of Fig. 1, the immediate effect of this energy coupling is effectively to transfer a wave energy mode existing between the two diametrally opposed conductors of a given conductor pair from that pair to a circumferentially adjacent conductor pair. The amplitude of the coupled wave is dependent both upon the parameters of the ferrite as influenced by the strength of the magnetic biasing field and the physical characteristics of the wave propagating structure itself. On the one hand, the amount of energy coupled between the conductor pairs depends upon the physical length of the coupling interval. That is, for a given magnetic biasing field strength, complete energy transfer from one conductor pair to its adjacent pair would be effected for a particular interval length. Such a complete energy transfer between the conductor pairs of the four-conductor structure of Fig. 1 effectively results in a "rotation" of the wave mode from one pair to the other. On the other hand, the amount of energy coupling, or degree of wave mode rotation, per unit length of the physical structure may be controlled by adjusting the strength of the magnetic biasing field. In a region below that region known as gyromagnetic resonance, an increase in the strength of the applied magnetic field causes an increase in the amount of energy coupled between the conductor pairs for a given physical length. In order that necessary phase relationships between the excited and reflected wave energy be produced, it is preferable that the operation of the present device be conducted below the gyroresonant region. The physical length of the coupling interval and the strength of the magnetic biasing field are chosen such that for a single traversal of the gyromagnetically active region by the propagating wave energy, one-half of the energy is transferred between the conductor pairs and, upon reflection from the shorting bars and retraversal by the energy of the active region, the remaining half is transferred. If one speaks of the rotation of the mode existing between the conductor pairs, the length of the coupling interval and the strength of the biasing field are adjusted to produce a 45° rotation for each complete traversal of the coupling interval.

Figure 2:
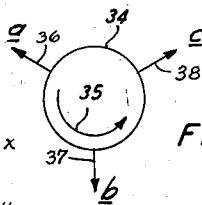
Fig. 2 is a symbolical representation of the coupling characteristic exhibited by the circulator of Fig. 1.

In the operation of the present invention for a given longitudinal direction of the biasing field produced by solenoid 31, wave energy supplied to the gyromagnetic structure by wave energy device 20 will be presented substantially completely for utilization by energy device 21. Substantially no energy will be presented for utilization by energy device 22. Similarly, wave energy supplied by device 21 will be presented substantially completely at device 22, while energy supplied by device 22 will emerge substantially completely at device 20. This coupling scheme is represented in Fig. 2 by the now well-known symbology comprising radial arrows 36, 37, and 38 associated with ring 34 and representative of the three external transmission line branches a, b, c corresponding to and including wave energy devices 20, 21, and 22, of Fig. 1, respectively. Arrow 35 circumferentially indicates the coupling progression among the branches. If the longitudinal direction of the biasing field associated with the ferrite is reversed, the order of progression among the branches is likewise reversed.

Figure 3:
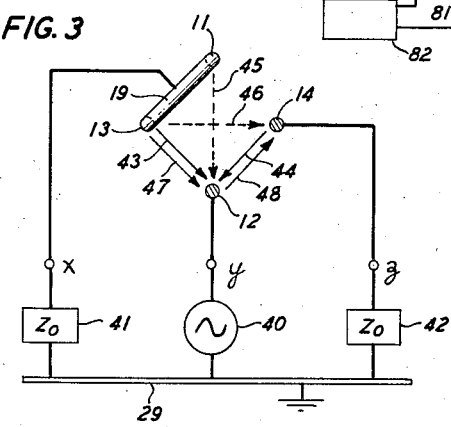
Figs. 3–5 are partial views of the end of the three-terminal network of Fig. 1 having the shorting member between two adjacent conductors, with schematically illustrated energy sources associated with terminals $y$, $z$, and $x$, respectively.
Figure 4:
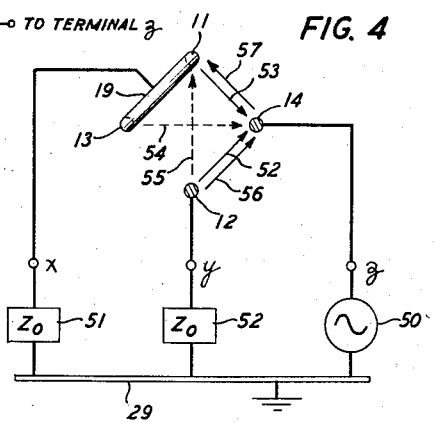
Figure 5:
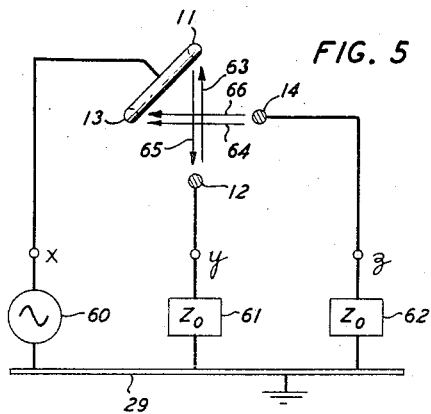

Figs. 3-5 represent partial end views of the three-terminal network of Fig. 1 with energy sources of impedance $Z_0$ associated respectively with terminals y, z, and x. Reference numerals associated with particular elements in Fig. 1 have been carried over to Figs. 3, 4 and 5 when appropriate. The terminals of the three-terminal network with which the energy source is not associated have associated therewith an energy utilizing device of impedance level $Z_0$. While a rigorous mathematical analysis of the operation of the three-terminal-pair circulator could be presented, it is felt that the simplified vectorial explanation which follows is more clearly indicative of the mode of operation of the device.

In Fig. 3 an electromagnetic transmission line branch including energy source 40 is connected between network terminal y and grounded common connection 29 while transmission line branches including energy sinks 41, 42 of impedance $Z_0$ are connected between network terminals x and z and ground potential, respectively. Upon application of source 40, equal potential differences will appear between conductors 13 and 12, as represented by vector 43, and between conductors 14 and 12, as represented by vector 44, thereby forming two possible current loops from source 40 through the network to ground. The resultant of vectors 43, 44 is represented as dashed vector 45. Vector 45 extends between conductor pair 11, 12 diametrally across the region occupied by the ferrite element associated with the three-terminal network. As the energy represented by vector 45 propagates along conductor pair 11, 12, it will be coupled into the ferrite and the diametral plane upon which the energy mode is centered will be effectively rotated in space. For the purposes of this explanation, it will be assumed that the magnetic biasing field direction is such that this rotation proceeds in a counterclockwise direction as viewed from the excited end of the network. The length of the coupling interval and the strength of the magnetic biasing field are adjusted to provide transfer of one-half of the energy contained in the resultant wave mode between the conductor pairs for each traversal of the ferrite loaded coupling region. As the coupling proceeds, energy is transferred from conductor pair 11, 12 to conductor pair 13, 14. Thus, after one traversal of the ferrite member, half of the energy originally between conductor pair 11, 12 has been transferred to pair 13, 14. All of the energy reaching shorting bars 17, 18 will be reflected therefrom toward the excited end of the network. Since the energy transfer produced by the ferrite coupling is antireciprocal, it will continue in a counterclockwise sense when viewed from the excited end regardless of the direction in which the energy is propagating along the structure. Thus the energy remaining between conductor pair 11, 12 will be reflected and then transferred to conductor pair 13, 14 as it propagates toward the input. When the reflected wave reaches the excited end, energy originally supported between conductors 11, 12 will have been completely transferred to conductors 13, 14. In Fig. 3, this is represented by dashed vector 46, oriented 90° counterclockwise from vector 45. Vector 46 may be designated the reflected wave, and vector 45, the applied wave. When the reflected wave appears at the excited end of the network, energy is still being applied by source 40, as represented by component vectors 43, 44. The reflected wave may be resolved into its components, maintaining in every case a reference to the network terminal with which the energy source is associated, here terminal y. Thus reflected wave 46 is represented as vectors 47, 48, directed between conductors 13 and 12, and 12 and 14, respectively. Since the impedance levels of sinks 41, 42 are equal in value and since the four-conductor system is symmetrical and essentially lossless, each of the vectors 43, 44, 47, 48 is of the same magnitude. By proper dimensioning of the circulator parameters the vector pairs between given terminals are caused to be exactly in either phase addition or phase opposition. In Fig. 3, vectors 44 and 48 are in 180° phase opposition and, therefore, no potential difference exists between terminals y and z. Thus, the voltage at terminal z mirrors the voltage at terminal y and, therefore, all voltage associated with terminal y appears at terminal z, and none at terminal x. Stated differently, there is an effective zero impedance or short circuit between conductors 12 and 14, permitting current to flow in the external transmission line branch including sink 42 while an effective infinite impedance occurs between conductors 13 and 12, developing a potential difference equal to the input voltage between these conductors and permitting substantially no current to flow in the external transmission line branch including sink 41. As illustrated in Fig. 2, energy originally supplied to the circulator at branch b proceeds in the direction of arrow 35 to branch c.

Fig. 4 is a partial end view of the four-conductor, three-terminal network with a transmission line branch including energy source 50 connected between terminal z and grounded common connection 29 while transmission line branches including energy sinks 51, 52, of impedance $Z_0$, are connected between terminals x and y, and ground, respectively. Upon the application of source 50, equal potential differences will appear between conductors 12 and 14, as represented by vector 52, and between conductors 11 and 14, as represented by vector 53, thereby forming two possible current loops from source 50 through the network to ground. The resultant of vectors 52, 53 is illustrated as dashed vector 54 which, after one complete traversal of the four-conductor structure, is rotated 90° counterclockwise and appears as dashed vector 55. Vector 55 may be resolved into vector components 56, between conductors 12, 14; and 57 between conductors 14, 11. Since there is a 180° phase difference between vectors 53 and 57 no potential difference exists between terminals z and x and therefore, current flows in the external transmission branch including sink 51. Since an effective infinite impedance is presented between conductors 12, 14, no current flows in the external transmission branch including sink 52 and therefore, substantially all of the energy supplied by source 50 appears in the external transmission branch connected between terminal x and ground.

Fig. 5 represents a partial end view of the four-conductor structure with a transmission line branch including energy source 60 connected between network terminal x and grounded common connection 29 while transmission line branches including sinks 61, 62 of impedance $Z_0$ are connected between network terminals y and z and ground, respectively. Upon the application of source 60, equal potential differences will appear diametrally between conductor pair 11, 12, as represented by vector 63, and between conductor pair 14, 13 as represented by vector 64, again forming two possible current loops from the source 60 through the network to ground. After a complete traversal, the energy appears as vectors 65, 66 between the conductor pairs. Since the potential differences are of equal magnitude but opposite phase between conductor pair 11, 12, terminals x and y are at the same potential and current flows in the external transmission branch including sink 61. In view of the effective infinite impedance presented between conductors 13, 14, no current flows in the external transmission branch including sink 62 and substantially all of the energy supplied by source 60 appears in the external transmission branch connected between terminal y and ground.

Figure 6:
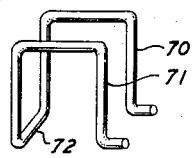
Fig. 6 is an alternate type of shorting member which may be utilized in applications of the invention requiring a broad frequency band of operation.

Fig. 6 is an alternate type shorting member which may be utilized in broad band applications of the invention. As the frequency of the input energy varies, the electrical length of the four-conductor network of Fig. 1 likewise varies. Since the proper operation of the network depends upon substantially complete cancellation of certain incident and reflected wave modes, it is desirable that the proper relative phase be maintained over as wide an operating range as possible. The shorting member of Fig. 6 is a parallel transmission line configuration comprising lines 70, 71, having a length equal to that of the length of the propagation path of wave energy from incidence to cancellation on the three-terminal network structure. These lines are joined at one extremity by shorting member 72, similar to shorting bars 17, 18 in Fig. 1. In its operation, the shorting member of Fig. 6 is connected between two adjacent conductors of the four-conductor structure of Fig. 1 such as, for example between wires 11, 13. As illustrated in Fig. 6, the line is doubled back or folded upon itself. Such construction results in a relatively compact shorting member.

Figure 7:
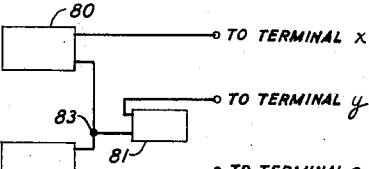
Fig. 7 is a schematic representation of the terminal connections in accordance with the invention when balanced transmission lines are used.

Fig. 7 is a schematic circuit illustrating the proper connection among the six terminals of three external balanced transmission line branches having two conductors each on the one hand and the three terminals of the four-conductor network on the other hand in order to produce circulator action among the external branches. In accordance with the invention, and as illustrated in Fig. 7, one of the two conductors associated with each of balanced wave energy devices 80, 81, 82 is tied to a common point 83. The remaining terminals associated with the balanced wave energy devices are connected, respectively, one each to terminals x, y and z of the phase network described above. The operation of the device proceeds in a manner analogous to that described above for the coaxial type transmission branch case. As mentioned previously, the impedance level associated with each of devices 80–82 should preferably correspond to the impedance $Z_0$ presented by diametrally opposed conductors of the four-conductor structure. However, when balanced wave energy type transmission branches are used, the necessity of preventing a grounded shield from being associated with the four-conductor structure is no longer present. Accordingly, it is possible to shield the phase network from external fields which may otherwise interfere with proper operation of the device. The circulator action among the external branches may be explained in a manner similar to the explanation above with respect to Figs. 3–5.

In all cases it is understood that the above-described arrangements are illustrative of a small number of the many specific embodiments which could represent application of the principles of the invention. Other arrangements can readily be devised in accordance with these principles by those skilled in the art without departing from the spirit and scope of the invention.

What is claimed is:

1. In combination, a plurality of parallel elongated conductors disposed about the circumference of a circle in diametrally opposed pairs having first and second ends, an elongated element of polarized gyromagnetic material coaxially disposed with respect to said conductors, conductive shorting members connecting said second ends of the conductors of each of said pairs, means for conductively connecting two adjacent ones of said first ends of said conductors to produce a three-terminal network, and three two-terminal wave energy devices having one terminal of each of said devices connected one each to each of the terminals of said three-terminal network, the remaining terminals of said devices being commonly connected.

2. An arrangement for intercoupling first, second, and third two-terminal devices, said arrangement comprising first, second, third, and fourth parallel elongated conductors adapted to support electromagnetic wave energy therebetween and disposed such that at transverse cross sections of said arrangement said conductors describe the four corners of a square, highly conductive connections between said first and said third conductors and between said second and said fourth conductors at one end thereof and between said first and said second conductors at the other end thereof, said other end presenting by virtue of the conductive connection only first, second, and third independent terminals, one terminal of said first two-terminal device connected to said first independent terminal, one terminal of said second two-terminal device connected to said second independent terminal, one terminal of said third two-terminal device connected to said third independent terminal, the remaining terminals of said two-terminal devices being connected together, and gyromagnetic wave energy coupling means occupying space between said conductors within said square.

3. A circulator network comprising a three-terminal, four-conductor structure comprising four spaced longitudinally extending conductors having gyromagnetic material disposed therebetween in coupling relationship with electromagnetic wave energy guided thereby in combination with three two-conductor transmission line branches having one conductor of each of said branches connected to a common point and the remaining three conductors of said branches connected one each to each of said three terminals of said four-conductor structure.

4. A three-terminal network adapted to support electromagnetic wave energy comprising a plurality of elongated conductors equally spaced transversely around the circumference of a circle with one conductor diametrally opposite each conductor and two conductors circumferentially adjacent each conductor, said conductors extending longitudinally parallel to each other, an elongated element of gyromagnetic material extending parallel to said conductors through the center of said circle, a conductive connection between each pair of diametrally opposite conductors at one end thereof, and a conductive connection between two circumferentially adjacent conductors at the other end thereof.

5. A nonreciprocal electromagnetic wave energy component comprising a plurality of parallel elongated conductors disposed about the circumference of a circle in pairs of diametrally opposed conductors having first and second ends, an elongated element of polarized gyromagnetic material coaxially disposed with respect to the cylinder described by said conductors, conductive shorting members connecting said second ends of the conductors of each of said pairs, and means for conductively connecting two adjacent ones of said first ends of said conductors.

6. The combination according to claim 5 in which said means for conductively connecting comprises a stub bar.

7. The combination according to claim 5 in which said means for conductively connecting comprises a parallel transmission line short-circuited at its end and having a length twice the distance between said first and second ends of said conductors.

8. In combination, first and second short-circuited pairs of similar transmission lines extending longitudinally parallel in intersecting perpendicular planes, means extending through the line defined by the intersection of said planes for coupling traveling electromagnetic wave energy supported in the plane of said first pair from said plane into the plane of said second pair, and highly conductive means connecting two adjacent conductors of said pairs of transmission lines at the ends thereof distant from said short circuits.

9. An electromagnetic wave energy component comprising first, second, third, and fourth parallel elongated conductors adapted to support said wave energy therebetween and disposed such that at transverse cross sections of said component said conductors describe the four corners of a square, highly conductive connections between said first and said third conductors and between said second and said fourth conductors at one end thereof and between said first and said second conductors at the other end thereof, and gyromagnetic wave energy coupling means occupying space between said conductors within said square.

References Cited in the file of this patent

UNITED STATES PATENTS 2,631,241    Schmidt _____ Mar. 10, 1953